(12) United States Patent
Bower, III et al.

(10) Patent No.: US 10,114,653 B2
(45) Date of Patent: Oct. 30, 2018

(54) MULTIPLE-STAGE BOOTLOADER AND FIRMWARE FOR BASEBOARD MANAGER CONTROLLER AND PRIMARY PROCESSING SUBSYSTEM OF COMPUTING DEVICE

(71) Applicant: Lenovo Enterprise Solutions (Singapore) PTE. LTD., New Tech Park (SG)

(72) Inventors: Fred Allison Bower, III, Durham, NC (US); Ajay Dholakia, Morrisville, NC (US); Scott Kelso, Cary, NC (US); Gregory B. Pruett, Raleigh, NC (US)

(73) Assignee: Lenovo Enterprise Solutions (Singapore) PTE. LTD., New Tech Park (SG)

( * ) Notice: Subject to any disclaimer, the term of this patent is extended or adjusted under 35 U.S.C. 154(b) by 138 days.

(21) Appl. No.: 15/178,076

(22) Filed: Jun. 9, 2016

(65) Prior Publication Data
US 2017/0357515 A1    Dec. 14, 2017

(51) Int. Cl.
| G06F 9/44 | (2018.01) |
| G06F 9/4401 | (2018.01) |
| G06F 8/65 | (2018.01) |
| H04L 29/08 | (2006.01) |
| G06F 8/654 | (2018.01) |

(52) U.S. Cl.
CPC .............. *G06F 9/4405* (2013.01); *G06F 8/65* (2013.01); *G06F 8/654* (2018.02); *G06F 9/4406* (2013.01); *G06F 9/4411* (2013.01); *H04L 67/34* (2013.01)

(58) Field of Classification Search
CPC ......... G06F 9/4405; G06F 8/65; G06F 9/4411
See application file for complete search history.

(56) References Cited

U.S. PATENT DOCUMENTS

| 7,484,084 B1 * | 1/2009 | Ranaweera | ............... G06F 8/67 713/1 |
| 2005/0228888 A1 * | 10/2005 | Mihm | ....................... G06F 8/65 709/227 |
| 2006/0136703 A1 * | 6/2006 | Wisecup | ............... G06F 9/4416 713/2 |

* cited by examiner

*Primary Examiner* — Jaweed A Abbaszadeh
*Assistant Examiner* — Gayathri Sampath
(74) *Attorney, Agent, or Firm* — Jason Friday

(57) ABSTRACT

At power on of a computing device, a baseboard management controller (BMC) of the computing device executes, a first-stage bootloader program to download a second-stage bootloader program from a first server. The BMC executes the second-stage bootloader program to download third-stage firmware of the BMC from a second server. The BMC executes the third-stage firmware to download firmware of a primary processing subsystem of the computing device from a third server, and to start the primary processing subsystem by causing the primary processing subsystem to execute the firmware of the primary processing subsystem.

20 Claims, 3 Drawing Sheets

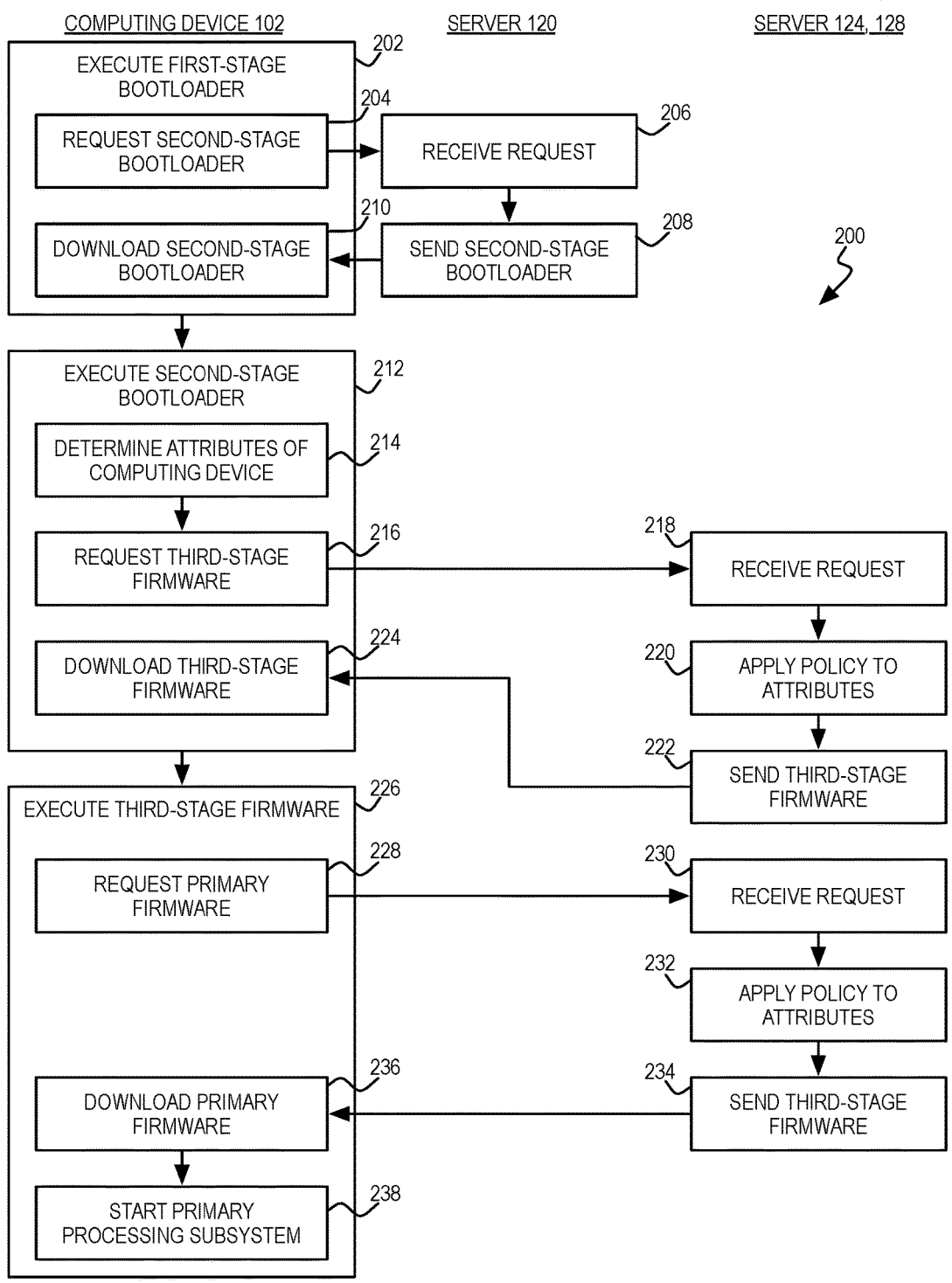

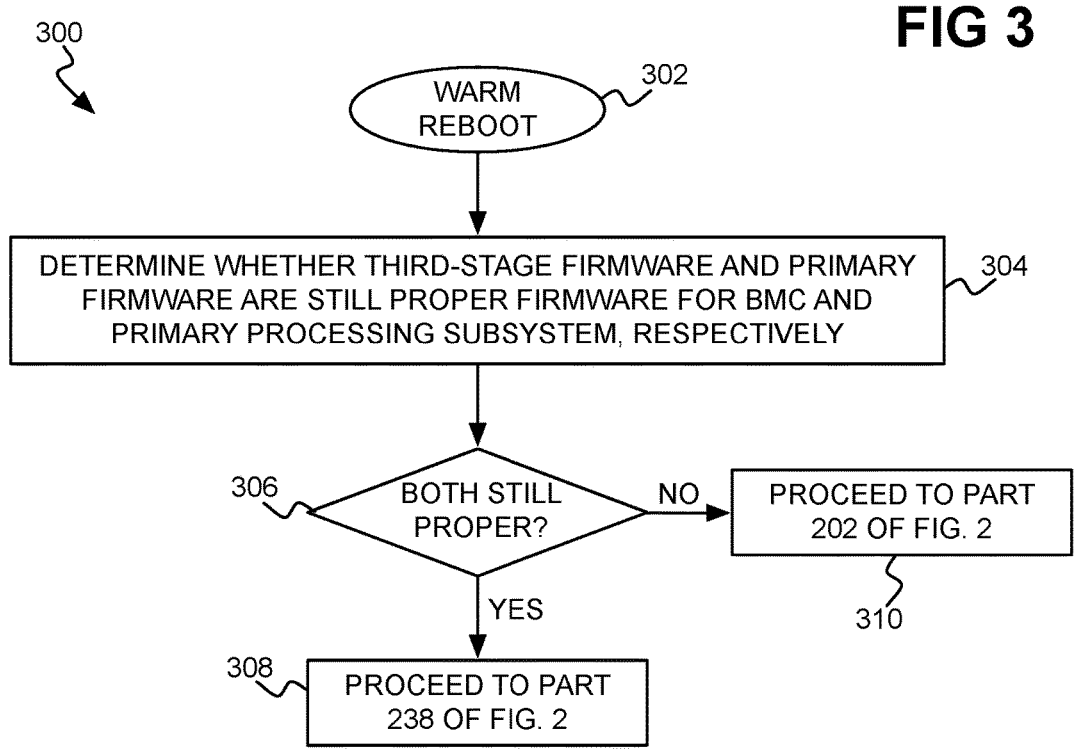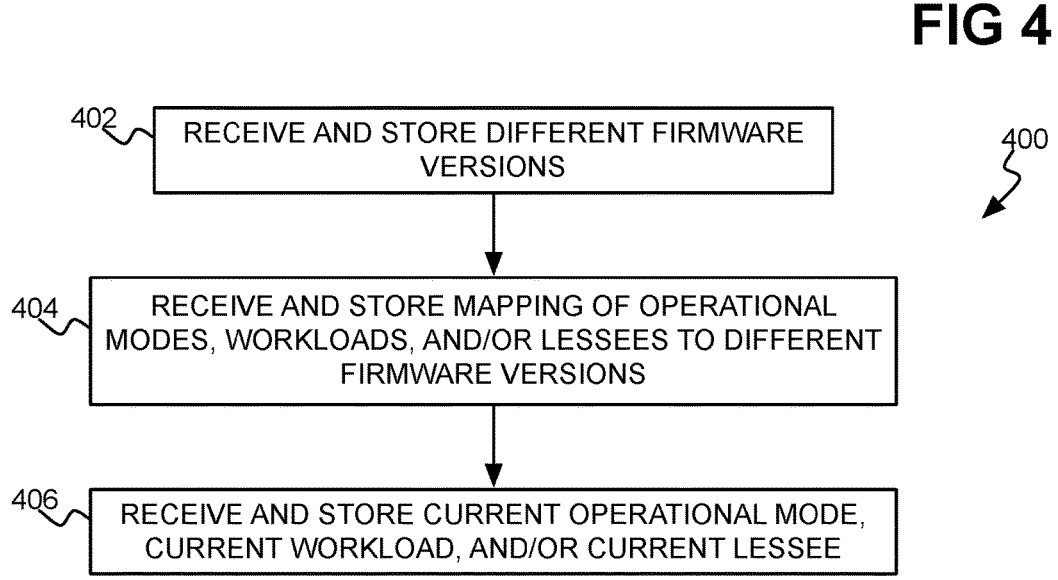

MULTIPLE-STAGE BOOTLOADER AND FIRMWARE FOR BASEBOARD MANAGER CONTROLLER AND PRIMARY PROCESSING SUBSYSTEM OF COMPUTING DEVICE

BACKGROUND

A computing device like a server computing device commonly includes a baseboard management controller (BMC), which is also known as a service processor, in addition to a primary processing subsystem that includes a central processing unit (CPU), or primary processor. While the primary processing subsystem performs the workload assigned to the server, the BMC is used for out-of-band management of the server. For example, while a computing system like a server may normally be able to be managed through the primary processing subsystem itself, if the operating system running on primary processing subsystem fails, or if hardware of the primary processing subsystem fails, then such in-band management may become impossible. However, out-of-band management via a BMC is still possible, because the BMC does not rely on the primary processing subsystem. Furthermore, management via the BMC may not utilize the resources of the primary processing subsystem, so that they can be dedicated to performing the server's assigned workload.

SUMMARY

An example method includes, at power on of a computing device, executing, by a baseboard management controller (BMC) of the computing device, a first-stage bootloader program to download a second-stage bootloader program from a first server over a network. The method includes, after downloading the second-stage bootloader program, executing, by the BMC, the second-stage bootloader program. Execution of the second-stage bootloader program causes the BMC to determine attributes of the computing device, send a request including the attributes to a second server over the network for third-stage firmware of the BMC, and download the third-stage firmware from the second server over the network. The third-stage firmware is selected by the second server based on at least the attributes provided by the BMC in the request. The method includes, after downloading the third-stage firmware, executing, by the BMC, the third-stage firmware. Execution of the third-stage firmware causes the BMC to send a request including the attributes to a third server for firmware of a primary processing subsystem of the computing device, and download the firmware of the primary processing subsystem from the third server over the network. The firmware is selected by the third server based on at least the attributes provided by the BMC in the request. The method includes, after downloading the firmware, starting, by the BMC executing the third-stage firmware, the primary processing subsystem by causing the primary processing subsystem to execute the firmware.

An example non-transitory computer-readable data storage medium stores computer-executable code that a server computing device executes to perform a method. The method includes receiving, over a network, a request from a BMC of a computing device for firmware of a primary processing subsystem of the computing device. The request includes attributes of the computing device. The method includes applying a policy to the attributes of the computing device to select the firmware from different firmware of the primary processing subsystem stored by the server computing device and specific to a type of the computing device. The policy takes into account one or more of: a geographic location of the computing device; an owner of the computing device; a current lessee of the computing device; a current workload of the current lessee of the computing device; and a current operational mode of the computing device. The method includes sending, over the network, the selected firmware to the BMC of the computing device for execution by the primary processing subsystem of the computing device.

An example computing device includes a primary processing subsystem having a processor and volatile memory. The computing device includes a BMC having a processor, network hardware to connect the computing device to a network, and volatile memory. The computing device includes non-volatile memory of the BMC to store a first-stage bootloader program that the processor of the BMC executes to download a second-stage bootloader program from a first server over the network into the volatile memory of the BMC. The processor of the BMC is further to, after downloading the second-stage bootloader program into the volatile memory of the BMC, execute the second-stage bootloader program to download third-stage firmware of the BMC from a second server over the network into the volatile memory of the BMC. The third-stage firmware of the BMC is selected based on attributes of the computing device. The processor of the BMC is further to, after downloading the third-stage firmware into the volatile memory of the BMC, execute the third-stage firmware to download firmware of the primary processing subsystem from a third server over the network into the volatile memory of the primary processing subsystem. The firmware of the primary processing subsystem is selected based on the attributes of the computing device. The processor of the BMC is further to, after downloading the firmware of the primary processing subsystem into the volatile memory of the primary processing subsystem, start the primary processing subsystem by causing the processor of the primary processing subsystem to execute the firmware of the primary processing subsystem.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

FIG. 2 is a flowchart of an example method of a multiple-stage process by which a computing device downloads firmware for a baseboard manager controller (BMC) of the computing device and firmware for a primary processing subsystem of the computing device.

FIG. 3 is a flowchart of an example method for determining whether to execute the multiple-stage process of FIG. 2 at warm reboot of a computing device.

FIG. 4 is a flowchart of an example method for specifying the policy by which firmware of a computing device is selected when the multiple-stage process of FIG. 2 is performed.

DETAILED DESCRIPTION

Figure 1:
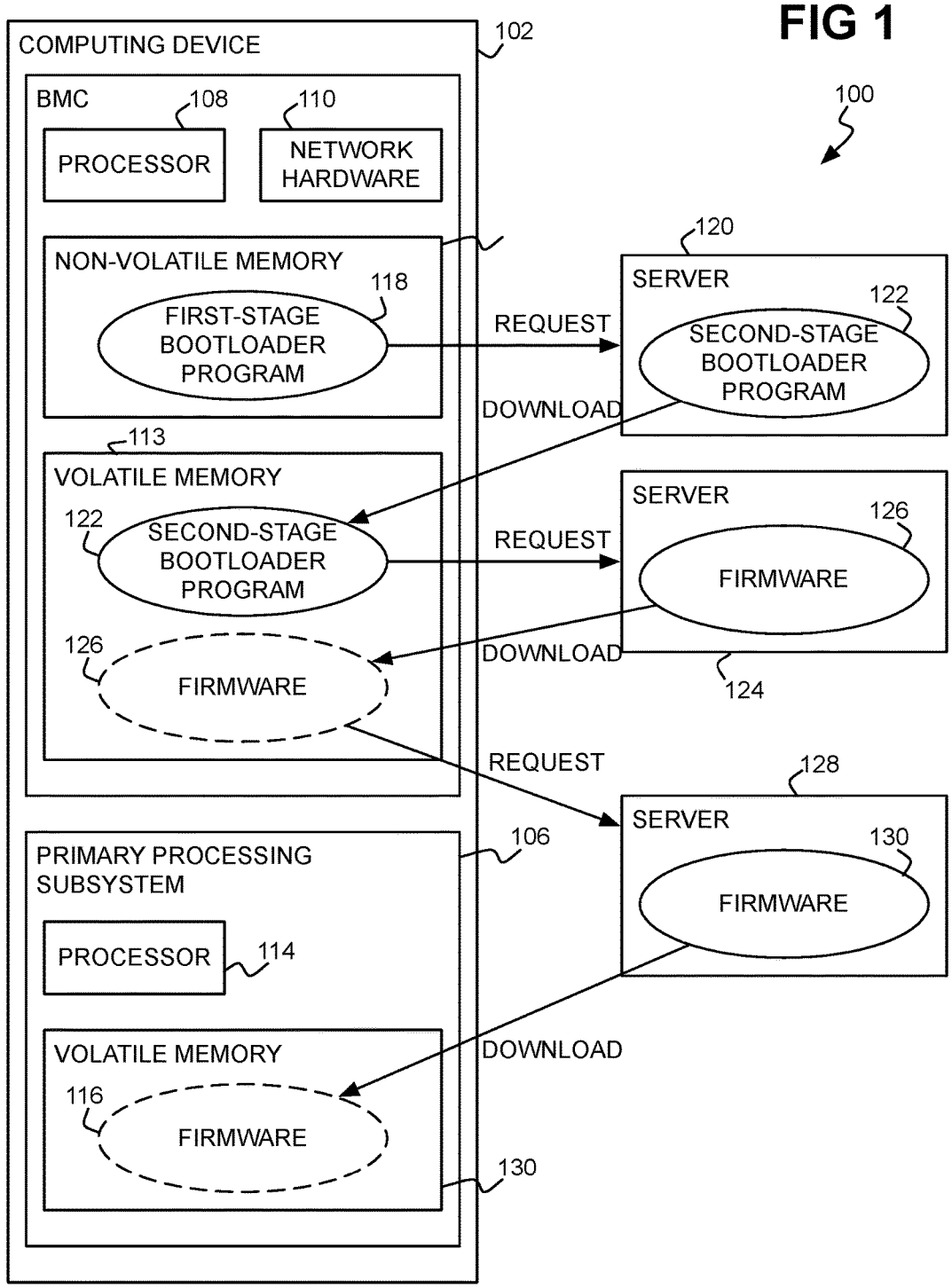
FIG. 1 is a diagram of an example system including a computing device that downloads bootloader programs and firmware over various stages.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the embodiment of the invention is defined only by the appended claims.

As noted in the background section, a computing device like a server can include both a baseboard management controller (BMC), or service processor, as well as a primary processing subsystem that includes a central processing unit (CPU), or primary processor. Both the BMC and the primary processing subsystem include firmware.

Firmware performs hardware initialization during the booting process, such as during power-on startup, and provides runtime services for operating system and programs. Firmware is thus lower-level computer-executable code than operating systems, and can be responsible for starting up the hardware of a computing device prior to starting the operating system. Firmware can further provide services to the operating system of a computing device, including power management and other services. Types of firmware for the primary processing subsystem of a computing device can include the basic input/output system (BIOS), as well as the unified extensible firmware interface (UEFI).

Both the BMC and the primary processing subsystem have their own firmware, and each can have multiple different versions. Although generally it may be desirable to use the most recent firmware version released by a manufacturer, in some usage scenarios, an end user may wish to use a different firmware version, such as an older firmware version or a custom firmware version, for either or both of the BMC and the primary processing subsystem. As one example, the software applications that the end user plans on deploying on a computing device may not be compatible with the most recent firmware version.

Firmware distribution and installation is logistically challenging, however. Generally, each server computing device has to be taken out of operation so that the firmware of its BMC or primary processing subsystem can be updated, and subsequently tested. Although this process may just take tens of minutes, an enterprise may have a large number of server computing devices to upgrade, requiring in effect many people hours engaged in what can be a quite laborious process. Recent BMC management computer programs, such as an integrated management module (IMM), permit firmware to be remotely updated over a network. Even with this added convenience, however, the firmware updating process remains complex, and is infrequently accomplished.

Techniques disclosed herein alleviate these shortcomings in ensuring that the firmware of the BMC and of the primary processing subsystem remain optimal for the current usage scenario of a computing device. At power on of the computing device, the BMC executes a first-stage bootloader program to download a second-stage bootloader program over a network. The second-stage bootloader program determines various attributes of the computing device, and sends a request for a (third-stage) firmware of the BMC to a server. The request includes the attributes, and the server selects the appropriate firmware of the BMC based on at least these attributes. The second-stage bootloader program downloads the selected third-stage firmware.

The third-stage firmware, when executed by the BMC, further sends a request to a server for the firmware of the primary processing subsystem of the computing device. The request includes the attributes of the computing device, and the server selects the appropriate firmware for the primary processing subsystem based on at least these attributes. The BMC downloads the selected firmware of the primary processing subsystem, and starts the primary processing subsystem by causing it to execute the downloaded firmware. The BMC continues to execute the third-stage firmware at least to assist in out-of-band management of the primary processing subsystem.

The techniques disclosed therein thus ease firmware distribution and installation. The third-stage firmware of the BMC (as well as the second-stage bootloader program) and the firmware of the primary processing subsystem may be stored in volatile memory, with just the first-stage bootloader program stored in non-volatile memory. Therefore, each time the computing device is powered on, the first-stage bootloader program begins the process of downloading a second-stage bootloader program, which in turn sends a request for optimal (third-stage) firmware of the BMC, which then sends a request for optimal firmware of the primary processing subsystem of the computing device. In some implementations, the second-stage bootloader program, the third-stage firmware of the BMC, and the firmware of the primary processing subsystem may survive warm reboots of the computing device, and are just replaced if different versions are specified at such time.

Therefore, different firmware for both the BMC and the primary processing subsystem of a computing device can be controlled at the level of the server(s) that field the requests from the computing device for the firmware. Such servers can dictate which firmware a computing device is to use for its BMC and primary processing subsystem in accordance with a policy. For example, the policy may specify a firmware according to the current workload the computing device is to run, the current end user (i.e., lessee) of the computing device in a hosted computing device environment, the owner of the computing device, and the geographical location of the computing device. The policy may specify a firmware according to the current operational mode of the computing device as well, such as whether the computing device is to operate in a normal operational mode, a repair operational mode, or a safe operational mode, for instance. The policy may specify a firmware according to other factors and considerations as well, in addition to and/or in lieu of these.

FIG. 1 shows an example system 100 that includes a computing device 102. The computing device 102 may be a server computing device, such as a blade server. The computing device 102 may be a host computing device that is owned or managed by a service provider and leased or rented to customers or lessees, who submit workloads to the computing device 102 from a client computing device over a network for execution on the computing device 102. The computing device 102 may be one of a number of computing devices of an enterprise, for use in a shared manner, or for dedicated use by particular end users.

The computing device 102 includes a BMC 104 and a primary processing subsystem 106. As noted above, the primary processing subsystem 106 performs the workload assigned to the computing device 102—that is, the subsystem 106 performs the primary functionality of the device 102. By comparison, the BMC 104, or service processor, is used for out-of-band management of the primary processing subsystem 106.

The BMC 104 includes a processor 108, network hardware 110, non-volatile memory 112, and volatile memory 113. The BMC 104 can include other components, such as other hardware components and software components, in addition to those depicted in FIG. 1. The network hardware 110 communicatively connects at least the BMC 104 of the computing device 102 to a network, which can be or include the Internet, wired networks, wireless networks, mobile data networks, telephony networks, local-area networks (LANs), wide-area networks (WANs), intranets, extranets, and so on.

The non-volatile memory 112 can be non-volatile semiconductor memory, such as flash memory or electronically erasable programmable read-only memory (EEPROM). The non-volatile memory 112 stores a first-stage bootloader program 118 that is executable by the processor 108. The computing device 102 when shipped from a manufacturer to a customer, such as an end user, organization, or service provider, may have the first-stage bootloader program 118 already stored in the non-volatile memory 112.

The BMC 104, at power on of the computing device 102 and such as after power-on self test (POST) has been performed, executes the first-stage bootloader program 118. The bootloader program 118 is computer-executable code that loads and runs other software. The bootloader program 118 is a first-stage bootloader program in that it is executed in a first stage of multiple stages of various program execution within the BMC 104 before the BMC 104 starts the primary processing subsystem 106.

The first-stage bootloader program 118 is a compact and minimal bootloader program, which functionality just to download a second-stage bootloader program 122 into the volatile memory 113 from a server 120 over a network. The first-stage bootloader program 118 may request the second-stage bootloader program 122 from the server 120 and resultantly download the bootloader program 122 therefrom in accordance with the pre-boot execution environment (PXE) specification. For example, the first-stage bootloader program 118 may have hardcoded therein a network address of the server 120 from which to download the second-stage bootloader program 122.

Once the second-stage bootloader program 122 has been downloaded into the volatile memory 113, the BMC 104 may authenticate the bootloader program 122 before the processor 108 executes the BMC 104 from the volatile memory 113. The volatile memory 113 may be volatile semiconductor memory, such as dynamic random-access memory (DRAM). Whereas the non-volatile memory 112 retains its contents, and thus the first-stage bootloader program 118, when power is removed from the computing device 102, the volatile memory 113 does not unless it has an internal battery backup or other internal power source.

The second-stage bootloader program 122 is more complex than the first-stage bootloader program 118. This is why there are two bootloader programs 118 and 122 executed by the BMC 104. The first-stage bootloader program 118 is sufficiently compact, minimal, and lacking in complexity that the potential for bugs to be coded into the bootloader program 118 is low. Indeed, the source code for the first-stage bootloader program 118 may be shared by the developer to the public, such as in an open source manner, so that other parties can inspect the code for errors. As such, the first-stage bootloader program 118 is unlikely to have to be updated once it has been deployed, either to fix bugs, or to add functionality thereto.

The bootloader program 122 is a second-stage bootloader program in that it is executed in a second stage of multiple stages of various program execution within the BMC 104 before the BMC 104 starts the primary processing subsystem 106. The second-stage bootloader program 122 upon execution may scan the hardware and/or software of the computing device 102 to determine attributes of the computing device 102. These attributes can include the vital product data (VPD) of the computing device 102, which is a collection of configuration and informational data associated with the computing device 102, such as part numbers, serial numbers, and engineering change levels. These attributes can include the data stored on the field-replaceable unit (FRU) information device of the computing device 102 as well, which similarly can include serial numbers, part numbers, and other information regarding the computing device 102.

The second-stage bootloader program 118 sends a request to a server 124 over a network for third-stage firmware 126 of the BMC 104. Neither bootloader program 118 nor 122, by comparison, is actual firmware of the BMC 104, in that the bootloader programs 118 and 122 may be unable to start the primary processing subsystem 106 themselves, nor provide for out-of-band management of the primary processing subsystem 106, unlike actual firmware. The bootloader programs 118 and 122 can be specific to the type of the computing device 102. As to the first-stage bootloader program 118, this can be because, since it is stored in the non-volatile memory 112 during manufacture of the computing device 102, the manufacturer can ensure that the bootloader program 118 is appropriate for the computing device 102. As to the second-stage bootloader program 122, this can be because the network address, such as a uniform resource locator (URL) address, hardcoded into the first-stage bootloader program 118 results in the downloading of the second-stage bootloader program 122 particular to the computing device 102.

The request that the second-stage bootloader program 118 sends to the server 124 includes the attributes of the computing device 102 that have been determined. The server 124 can store multiple versions of firmware compatible with the BMC 104 of the computing device 102. The server 124 selects the third-stage firmware 126 that the second-stage bootloader program 118 is to download to the volatile memory 113 based on these attributes. For example, the server 124 can apply a policy against these attributes. The server 124 can look up using these attributes, such as within a database, whether the computing device 102 is being used by a particular end user, such as the owner of the device 102, the current lessee of the device 102, and so on. The server 124 can further look up using these attributes whether the computing device 102 is currently located in a particular geographical region, and whether it is to run a particular workload or type of workload. The server 124 may look up whether the computing device 102 is to operate in a particular operational mode, such as a normal operational mode, or a repair operational mode or safe operational mode if the server 124 had earlier reported that it had been malfunctioning, for instance.

Once the third-stage firmware 126 has been downloaded into the volatile memory 113, the BMC 104 may authenticate the firmware 126 before the processor 108 executes the firmware 126. The firmware 126 is third-stage firmware in that it is executed in a third stage of multiple stages of various program execution within the BMC 104 before the BMC 104 starts the primary processing subsystem 106. In the example of FIG. 1, there are three stages of program execution, two bootloader programs 118 and 122 and the firmware 126. The first-stage bootloader program 118 executes first, and after downloading the second-stage bootloader program 122, turns over execution to the second-stage bootloader program 122. The second-stage bootloader program 122 then downloads the third-stage firmware 126, and turns over execution to the firmware 126.

The third-stage firmware 126 is thus specific to the type of the computing device 102, like the bootloader programs 118 and 122 are, and also can be specific to a policy-dictated current usage scenario of the computing device 102, based on the workload, owner, lessee, operational mode, geographical location, and so on, of the device 102, as noted above. The firmware 126 sends a request to a server 128 over a network for firmware 130 of the primary processing subsystem 106 of the computing device 102. This request also includes the attributes of the computing device 102 that have been determined. The server 128 may be the same server as the server 124, or a different server. Likewise, the server 124 may be the same server as the server 120, or a different server. That is, while three specific servers 120, 124, and 128 are depicted in FIG. 1, there can be just one such server, or two such servers, in other implementations.

The server 128 can store multiple versions of firmware compatible with the primary processing subsystem 106 of the computing device 102. The server 128 selects the firmware 130 that the third-stage firmware 126 of the BMC 104 is to download based on the attributes of the computing device 102. The server 128 can apply a policy against these attributes, in the same way as has been described as to the server 124 vis-à-vis the third-stage firmware 126. The primary processing subsystem 106 also includes a processor 114 and volatile memory 116, which may be of the same type as the volatile memory 113 of the BMC 104. The primary processing subsystem 106 may include other hardware components and software components as well, such as its own network hardware so that the subsystem 106 does not have to share the network hardware 110 of the BMC 104.

The third-stage firmware 126 of the BMC 104 downloads the selected firmware 130 of the primary processing subsystem 106 from the server 128 to the volatile memory 116. The BMC 104 may authenticate the firmware 130. Once authenticated, the third-stage firmware 126 of the BMC 104 starts the primary processing subsystem 106, by causing the processor 114 to execute the firmware 130 from the volatile memory 116. The third-stage firmware 126 can continue to run, however, to monitor and manage operation of the primary processing subsystem 106. The third-stage firmware 126 thus differs from the first- and second-stage bootloader programs 118 and 122 in that it is actual firmware of the BMC 104 that can start the primary processing subsystem 106, and that continues to run once it has executed another program.

The firmware 130 of the primary processing subsystem 106, like the bootloader programs 118 and 122 and like the firmware 126 of the BMC 104, can be specific to the type of computing device 102. Like the firmware 126 of the BMC 104, the firmware 130 of the primary processing subsystem 106 can be specific to a policy-dictated current usage scenario of the computing device 102. The firmware 126 of the primary processing subsystem 106 may perform its own initial testing of hardware, such as that of the primary processing subsystem 106, before proceeding to load and start an operating system on the subsystem 106. The operating system in turn may load and run various application computer programs, and so on. The firmware 126 remains running to provide services to the operating system, as noted above.

FIG. 2 shows an example method 200 that illustrates the functionality that has been described in relation to FIG. 1. The parts of the method 200 in the left column are performed by the computing device 102; the parts in the middle column are performed by the server 120; and the parts in the right column are performed by the servers 124 and 128, which in the example of FIG. 2 is one server 124, 128. The left, middle, and right parts of the columns of the method 200 may be implemented as computer-executable code stored on a non-transitory computer-readable data storage medium and executed by a processor of the computing device 102, the server 120, and the server 124, 128, respectively. Performance of the method 200 is initiated at power on of the computing device 102, such as at cold boot of the computing device 102.

The processor 108 of the BMC 104 of the computing device executes the first-stage bootloader program 118 from the non-volatile memory 112 (202). As such, the BMC 104 requests, over a network, the second-stage bootloader program 122 from the server 120 (204), which receives the request (206), and sends the second-stage bootloader program 122 to the BMC 104 (208). Therefore, the BMC 104 downloads the second-stage bootloader program 122 into the volatile memory 113 of the BMC 104 (210). Since the first-stage bootloader program 118 has effectively loaded the second-stage bootloader program 122, it now boots, or executes, the second-stage bootloader program 122, and ceases execution itself.

The BMC 104 thus executes the second-stage bootloader program 122 from the volatile memory 113 (212). As such, the BMC 104 determines the attributes of the computing device 102 (214), and sends a request for the third-stage firmware 126 over the network to the server 124, 128 (216), which receives the request (218). The request includes the determined attributes. The server 124, 128 applies a policy to the attributes to select the third-stage firmware 126 from a number of different such firmware that it stores and which are each specific to the type of the computing device 102 (220) (that is, which are compatible with the computing device 102). The server 124, 128 sends the selected third-stage firmware 126 to the BMC 104 (222). Therefore, the BMC 104 downloads this third-stage firmware 126 into the volatile memory 113 of the BMC 104 (224). Since the second-stage bootloader program 122 has effectively loaded the third-stage firmware 126, it now boots, or executes, the firmware 126, and ceases execution itself.

The BMC 104 thus executes the third-stage firmware 126 from the volatile memory 113 (226). As such, the BMC 104 sends a request for the firmware 130 of the primary subsystem 106 over the network to the server 124, 128 (228), which receives the request (230). This request also includes the determined attributes. The server 124, 128 applies a policy, such as the same policy applied in part 220, to the attributes to select the firmware 130 of the primary subsystem 106 from a number of different such firmware that it stores and which are each specific to the type of the computing device 102 (232) (that is, which are compatible with the computing device 102). The server 124, 128 sends the selected firmware 130 of the primary processing subsystem 106 to the BMC 104 (234). Therefore, the BMC 104 downloads this firmware 130 of the primary processing subsystem 106 into the volatile memory 116 of the subsystem 106 (236). The BMC 104 starts the primary processing subsystem 106 by causing the processor 114 thereof to execute the firmware 130 (238), although the BMC 104 continues to execute the firmware 130 to monitor and manage the subsystem 106.

FIG. 3 shows an example method 300 that the computing device 102 performs after the method 200 has been performed. The method 300 may be implemented as computer-executable code stored on a non-transitory computer-readable data storage medium, and executable by a processor of the computing device 102, such as the processor 108 of the BMC 104. The method 300 is performed at warm reboot of the computing device (302). This means that the computing device 102 has been reset, similar to powering off and powering back on the device 102, but without actually removing power from the computing device 102. The computing device 102, to perform the method 300, is configured so that the contents of the volatile memory 113 and 116 that store the firmware 126 and 130, respectively, are not erased during warm reboot.

The BMC 104 determines whether the third-stage firmware 126 of the BMC 104 is still the proper firmware for the BMC 104 and whether the firmware 130 of the primary processing subsystem 106 is still the proper firmware for the primary processing subsystem 106 (304). For example, the BMC 104 may compute a hash of the firmware 126 and send it to the server 124. The server 124 tracks the most recent firmware 126 it sent to the computing device 102, and can compute the hash of its copy of the firmware 126. If the hashes agree, then the server 124 can report back that the firmware 126 at the computing device 102 is proper. If they do not agree, then the server 124 can respond that the firmware 126 at the computing device 102 is no longer proper.

The firmware 126 stored in the volatile memory 113 may no longer be proper if it has become corrupted. Furthermore, the server 126 may invalidate the firmware 126 stored in the volatile memory 113. For example, even if the firmware 126 stored in the volatile memory 113 has not become corrupted, since the time the firmware 126 was downloaded by the BMC 104, the policy that the server 124 applied to select the firmware 126 may have changed, such that the firmware 126 should be replaced with different firmware. Therefore, in this case, the server 124 can report back that the firmware 126 is improper when the BMC 104 sends it the hash of the firmware 126 stored at the computing device 102. The same hashing process can be performed between the BMC 104 of the computing device 102 and the server 128 with respect to the server 130 of the primary processing subsystem 106.

If both the firmware 126 stored in the volatile memory 113 and the firmware 130 stored in the volatile memory 116 are still proper, then the BMC 104 proceeds to part 238 of the method 200 of FIG. 2 (308). That is, the BMC 104 does not execute the first-stage bootloader program 118, does not re-download and execute the second-stage bootloader program 122, does not re-download the firmware 126, and does not re-download the firmware 130. This results in the warm reboot process occurring more quickly than the cold reboot process of the method 200 in which the bootloader program 122, the firmware 126, and the firmware 130 are each downloaded and executed.

However, if either or both of the firmware 126 stored in the volatile memory 113 and the firmware 130 stored in the volatile memory 116 are no longer proper, then the BMC 104 proceeds to part 202 of the method 200 of FIG. 2 (310). That is, the second-stage bootloader program 122 is downloaded and executed again, the firmware 126 is downloaded again prior to it being executed again, and the firmware 130 is downloaded again prior to it being executed again. In this case, the warm reboot process becomes identical to the cold reboot process of the method 200.

FIG. 4 shows an example method 400 that the server 124, 128 performs prior to the method 200 being performed. The method 400 may be implemented as computer-executable code stored on a non-transitory computer-readable data storage medium, and executed by a processor of the server 124, 128. The method 400 is performed to establish the policy by which the firmware 126 and 130 that the computing device 102 is to download is selected.

Parts 402 and 404 can be performed for each of the firmware 126 and 130. The server 124, 128 receives and stores different versions of firmware (402). The server 124, 128 may receive these different firmware versions from the owner of the computing device 102, from the end user of the computing device 102, from the lessee(s) of the computing device 102, and so on. The server 124, 128 further receives specification of and stores a mapping of operational modes, workloads, and/or lessees to the different firmware versions (404). For example, the owner or a current lessee may specify which firmware version to use for each different operational mode, each different workload, or each different combination of workload and operational mode. The owner may specify which firmware version to use for each lessee, by operational mode and/or by workload, or each lessee may provide this information, for instance. Part 404 in effect establishes the policy by which the server 124, 128 selects the firmware for the computing device 102. Part 402 may be repeated as new firmware versions become available. Part 404 may be repeated as the policy changes.

The server 124, 128 also receives specification of and stores the current operational mode, current workload, and/or current lessee of the computing device 102 (406), as any of this information changes. The server 124, 128 may receive this information from the owner and/or the current lessee of the computing device 102. When the computing device 102 sends the attributes along with the request in part 216 or part 228 of the method 200, the server 124, 128 thus can use these attributes to determine which policy to apply, since the server 124, 128 may store multiple policies for multiple computing devices. The server 124, 128 then uses the information most recently received as to the computing device 102 in part 406 to actually apply the policy to select the firmware in question per the mapping of operational modes, workloads, and/or lessees to the firmware, based on the current operational mode, workload, and/or lessee.

The techniques that have been described herein provide for an efficient manner by which large numbers of computing devices, such as server computing devices, can have their BMC firmware and primary processing subsystem firmware managed. As firmware becomes available, and as which firmware a given computing device is to have changes, this information is stored in management servers like the servers 124 and 128. When the computing device is powered on (i.e., cold booted), or if the current firmware is invalidated and the computing device is warm booted, the computing device will retrieve and install the proper firmware for both its BMC and primary processing subsystem automatically, with no user interaction.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. Examples of non-transitory computer-readable media include both volatile such media, like volatile semiconductor memories, as well as non-volatile such media, like non-volatile semiconductor memories and magnetic storage devices. It is manifestly intended that this invention be limited only by the claims and equivalents thereof.

We claim:

1. A method comprising:
   at power on of a computing device, executing, by a baseboard management controller (BMC) of the computing device, a first-stage bootloader program to download a second-stage bootloader program from a first server over a network;
   after downloading the second-stage bootloader program, executing, by the BMC, the second-stage bootloader program that causes the BMC to:
      determine a plurality of attributes of the computing device;
      send a request to a second server over the network for third-stage firmware of the BMC, the request including the attributes;
      download the third-stage firmware from the second server over the network, the third-stage firmware selected by the second server based on at least the attributes provided by the BMC in the request;
   after downloading the third-stage firmware, executing, by the BMC, the third-stage firmware that causes the BMC to:
      send a request to a third server for firmware of a primary processing subsystem of the computing device, the request including the attributes;
      download the firmware of the primary processing subsystem from the third server over the network, the firmware selected by the third server based on at least the attributes provided by the BMC in the request; and
   after downloading the firmware, starting, by the BMC executing the third-stage firmware, the primary processing subsystem by causing the primary processing subsystem to execute the firmware.

2. The method of claim 1, wherein the first-stage bootloader program is stored in non-volatile memory of the computing device, and a network address of the first server is hardcoded in the first-stage bootloader program.

3. The method of claim 1, wherein the second-stage bootloader program is stored in volatile memory of the computing device, and is specific to a type of the computing device.

4. The method of claim 1, wherein the third-stage firmware is stored in volatile memory of the computing device, and is specific to a type of the computing device and to a policy-dictated current usage scenario of the computing device.

5. The method of claim 1, wherein the BMC continues to execute the third-stage firmware after starting the primary processing subsystem to monitor and manage operation of the primary processing subsystem.

6. The method of claim 1, wherein the first-stage bootloader program and the second-stage bootloader program are not firmware of the BMC and are unable to start the primary processing subsystem.

7. The method of claim 1, wherein the firmware of the primary processing subsystem is stored in volatile memory of the computing device, and is specific to a type of the computing device and to a policy-dictated current usage scenario of the computing device.

8. The method of claim 1, wherein the first server is a different server than the second server and the third server.

9. The method of claim 8, wherein the second server and the third server are a same server.

10. The method of claim 1, wherein the third-stage firmware of the BMC and the firmware of the primary processing subsystem are not erased during warm reboot of the computing device, the method further comprising:
   at the warm reboot of the computing device, determining, by the BMC, whether both the third-stage firmware of the BMC and the firmware of the primary processing subsystem remain proper for the computing device;
   if either or both of the third-stage firmware of the BMC and the firmware of the primary processing subsystem are no longer proper for the computing device, repeating the method at execution of the first-stage bootloader program by the BMC; and
   if both of the third-stage firmware of the BMC and the firmware of the primary processing subsystem are still proper for the computing device, executing, by the BMC, the third-stage firmware to cause the BMC to start the primary processing subsystem by causing the primary processing subsystem to execute the firmware.

11. A computing device comprising:
   a primary processing subsystem, including a processor and volatile memory;
   a baseboard management controller (BMC), including a processor, network hardware to connect the computing device to a network, and volatile memory;
   non-volatile memory of the BMC to store a first-stage bootloader program that the processor of the BMC executes to download a second-stage bootloader program from a first server over the network into the volatile memory of the BMC,
   wherein the processor of the BMC is further to, after downloading the second-stage bootloader program into the volatile memory of the BMC, execute the second-stage bootloader program to download third-stage firmware of the BMC from a second server over the network into the volatile memory of the BMC, the third-stage firmware of the BMC selected based on a plurality of attributes of the computing device,
   wherein the processor of the BMC is further to, after downloading the third-stage firmware into the volatile memory of the BMC, execute the third-stage firmware to download firmware of the primary processing subsystem from a third server over the network into the volatile memory of the primary processing subsystem, the firmware of the primary processing subsystem selected based on the attributes of the computing device,
   and wherein the processor of the BMC is further to, after downloading the firmware of the primary processing subsystem into the volatile memory of the primary processing subsystem, start the primary processing subsystem by causing the processor of the primary processing subsystem to execute the firmware of the primary processing subsystem.

12. The computing device of claim 11, wherein the processor of the BMC continues to execute the third-stage firmware after starting the primary processing subsystem to monitor and manage operation of the primary processing subsystem,
   wherein the first-stage bootloader program and the second-stage bootloader programs are not firmware of the BMC and are unable to start, monitor, and manage the primary processing subsystem.

13. The computing device of claim 11, wherein at warm reboot of the computing device, the volatile memory of the BMC and the volatile memory of the primary processing subsystem are not erased, wherein at the warm rebooting, the processor of the BMC determines whether both the third-stage firmware of the BMC and the firmware of the primary processing subsystem remain proper;

if either or both of the third-stage firmware of the BMC and the firmware of the primary processing subsystem are no longer proper, the processor of the BMC is to again execute the first-stage bootloader program; and if both of the third-stage firmware of the BMC and the firmware of the primary processing subsystem are still proper, the processor of the BMC is to execute the third-stage firmware to start the primary processing subsystem by causing the primary subsystem to execute the firmware of the primary processing subsystem.

14. A non-transitory computer-readable data storage medium storing computer-executable code that a base management controller (BMC) of a computing device server to perform a method comprising:

at power on of the computing device, executing a first-stage bootloader program to download a second-stage bootloader program from a first server over a network;

after downloading the second-stage bootloader program, executing the second-stage bootloader program that causes the BMC to:

determine a plurality of attributes of the computing device;

send a request to a second server over the network for third-stage firmware of the BMC, the request including the attributes;

download the third-stage firmware from the second server over the network, the third-stage firmware selected by the second server based on at least the attributes provided by the BMC in the request;

after downloading the third-stage firmware, executing the third-stage firmware that causes the BMC to:

send a request to a third server for firmware of a primary processing subsystem of the computing device, the request including the attributes;

download the firmware of the primary processing subsystem from the third server over the network, the firmware selected by the third server based on at least the attributes provided by the BMC in the request; and after downloading the firmware, starting, by executing the third-stage firmware, the primary processing subsystem by causing the primary processing subsystem to execute the firmware.

15. The non-transitory computer-readable data storage medium of claim 14, wherein the first-stage bootloader program is stored in non-volatile memory of the computing device, and a network address of the first server is hardcoded in the first-stage bootloader program.

16. The non-transitory computer-readable data storage medium of claim 14, wherein the second-stage bootloader program is stored in volatile memory of the computing device, and is specific to a type of the computing device.

17. The non-transitory computer-readable data storage medium of claim 14, wherein the third-stage firmware is stored in volatile memory of the computing device, and is specific to a type of the computing device and to a policy-dictated current usage scenario of the computing device.

18. The non-transitory computer-readable data storage medium of claim 14, wherein the BMC continues to execute the third-stage firmware after starting the primary processing subsystem to monitor and manage operation of the primary processing subsystem.

19. The non-transitory computer-readable data storage medium of claim 14, wherein the first-stage bootloader program and the second-stage bootloader program are not firmware of the BMC and are unable to start the primary processing subsystem.

20. The non-transitory computer-readable data storage medium of claim 14, wherein the firmware of the primary processing subsystem is stored in volatile memory of the computing device, and is specific to a type of the computing device and to a policy-dictated current usage scenario of the computing device.

* * * * *